UNITED STATES PATENT OFFICE.

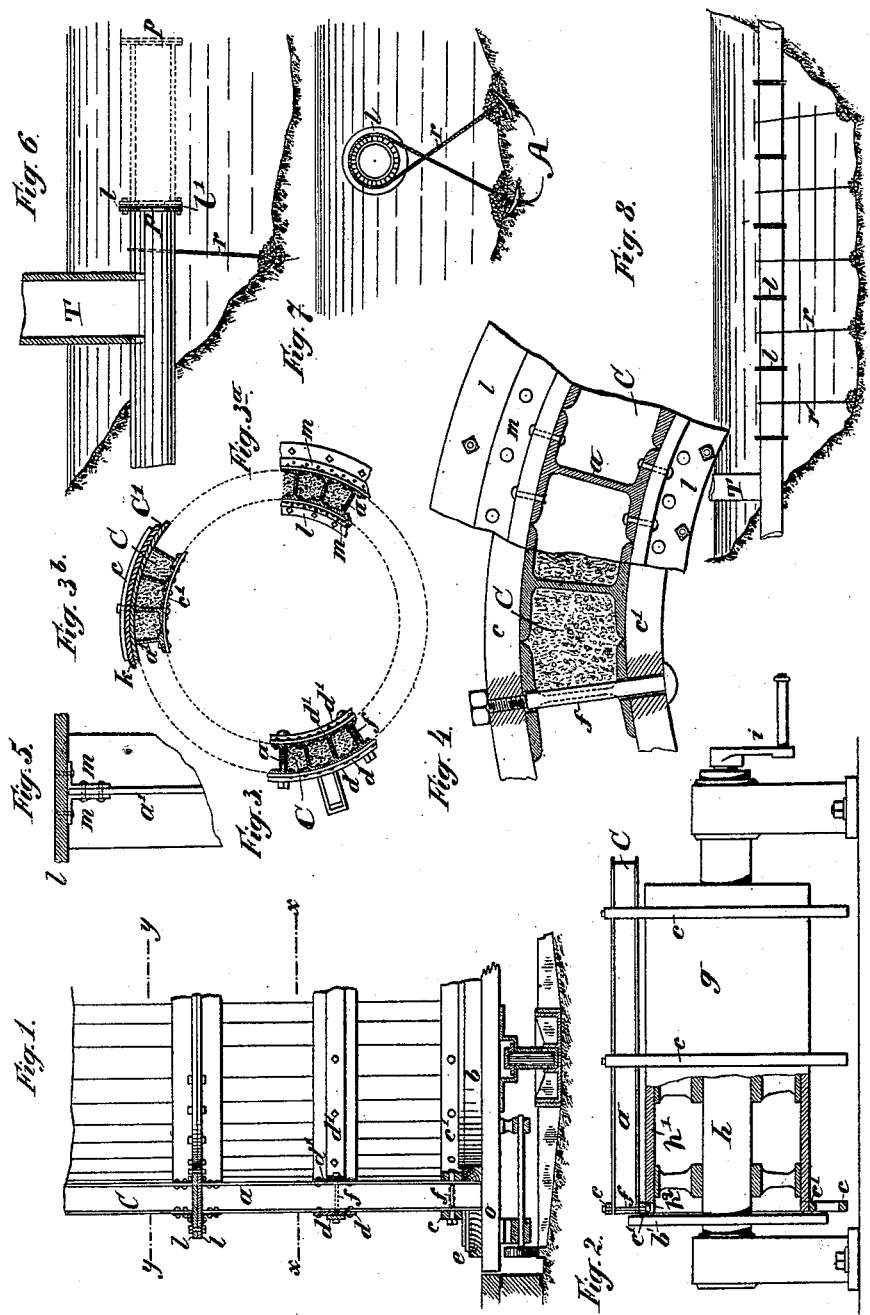

PETER KRAUS, OF VIENNA, AUSTRIA-HUNGARY.

FIRE-PROOF AND WATER-PROOF TUBE, ROOFING, WALL, AND LINING.

SPECIFICATION forming part of Letters Patent No. 466,246, dated December 29, 1891.

Application filed June 1, 1891. Serial No. 394,747. (No model.)

*To all whom it may concern:*

Be it known that I, PETER KRAUS, a subject of the Emperor of Austria, residing at Vienna, in the Province of Lower Austria, in the Empire of Austria-Hungary, have invented certain new and useful Improvements in Fire-Proof and Water-Proof Tubes, Roofings, Walls, and Linings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to the construction of tubular bodies especially designed for use as subways or conduits, such as tunnels, water-mains, sewers, &c. These subways or conduits have heretofore been constructed of masonry or of metal. The former construction is very expensive and under many circumstances difficult of execution—as, for instance, in sandy soil or under water—while the use of cast-metal bodies is limited, in that tubular bodies exceeding certain dimensions cannot be cast. On the other hand, the larger tubular castings now made are difficult to handle and to transport, and such bodies, owing to their rigidity are liable to become disjointed or to fracture under strain.

My invention has for its object a construction of tubular body whereby the difficulties referred to are avoided, that for a given capacity is not as expensive as the ordinary cast-metal tubular bodies, that is not limited in capacity, and much lighter and of greater elasticity than said cast-metal tubular bodies, and, being constructed of sections, is much more readily handled and transported.

The invention consists in the mode of constructing tubular bodies; also, in a tubular body composed, essentially, of a series of longitudinal bars assembled to form a tube of cylindrical or other form in cross-section, said bars being preferably constructed with a horizontal flange at one or both sides, having in section the form of an I or a T, so that when said bars are assembled the said flanges will lie in contact with one another, whereby a tubular body having a series of longitudinal chambers is obtained.

The invention further consists in the combination, with such a tubular body, of a fluid or both fluid and fire proof filling for said chambers.

The invention further consists in a novel mode of constructing submarine or subaqueous ways or conduits, and, lastly, The invention consists in details of construction and combinations of parts, as will be more fully described hereinafter, and as shown in the accompanying drawings, in which—

Figure 1 is a sectional elevation illustrating one mode of and means employed in the construction of tubular bodies embodying my invention. Fig. 2 is a like view illustrating other or modified means employed in the construction of said bodies. Figs. 3 and 3ª are transverse sections of portions of a tubular body embodying my invention, said sections being taken on or about on lines $x\,x$ and $y\,y$, respectively, of Fig. 1; and Fig. 3$^b$ is a like view illustrating the mode of constructing a tubular body with T-bars. Fig. 4 is a transverse sectional view of a portion of two abutting tubular bodies, illustrating the mode of and means for coupling two such bodies together. Fig. 5 is a sectional view illustrating the mode of securing the coupling-flange to a tubular body constructed of T-bars. Figs. 6, 7, and 8 illustrate the mode of constructing submarine ways or conduits.

Similar letters indicate like parts wherever such may occur in the above-described figures of drawings.

The principle of construction involving my invention consists, essentially, in the use of bars having the form of an I or T in cross-section, said bars being juxtaposited so as to form between their webs chambers or spaces extending longitudinally of the tubular body, and in the use of a filler the nature of which will vary according to the use made of such tubular bodies.

The bars $a$, whether of I or T iron, have the head and foot constructed according to the configuration the finished body is to have, whether cylindrical or ellipsoidal, and mechanical means varying in their construction may be used in forming these tubular bodies.

In Fig. 1 I have shown a turn-table $o$, to which is secured the ring form $b$, the tubular body to be constructed thereon being cylindrical in cross-section. This form $b$ is of a diameter equal to the inner periphery of the tubular body, the I-bars $a$ being set on end around the same with the head and foot flanges of the bars in contact with one another, said head and foot flanges being suitably proportioned as to width to form a more or less perfect circle when assembled, an interior and exterior hoop, brace-ring, or band $c'$ and $c$, respectively, being first placed in position, the former on the frame $b$ and the latter on a suitable annular support or on shoes or blocks $e$, arranged at a suitable distance from each other and around the form $b$. At suitable distances apart other hoops or brace rings or bands are placed upon the assembled bars $a$, the number of such hoops varying with the length of the tubular body and with the degree of resistance the body is to offer to the internal pressure. Instead of rings, flat sheet-metal bands $d$ and $d'$ may be applied exteriorly and interiorly and bolted to the bars $a$, preferably by means of through-bolts $f$, extending through the web of said bars and through the outer and inner hoops or rings $c\ c'$ or bands $d\ d'$. (See Fig. 4.) The tube so formed is now provided at each end with a coupling-flange consisting, essentially, of a ring $l$, of such diameter as to project sufficiently from the outer periphery of the tube for the purpose of coupling, and also to project sufficiently from the inner periphery to apply angle-irons $m$ for bolting the ring to the foot-flanges of the bars $a$, like angle-irons being used to bolt said ring to the head-flanges of the said bars. These rings $l$ form a closure for the opposite ends of the chambers C, thus forming a strong yet more or less elastic tube adapted for use as a subway, for instance, or a lining for a tunnel. If the tube is to be fluid-tight, this can readily be attained by filling the chambers C with a suitable material after one of the coupling-flanges has been affixed to one end of the tube, which is then turned and set on end on said flange and the chambers filled. The filling may consist of any suitable material or compound—as, for instance, hydraulic cement or a concrete.

I have found that a composition composed of cork, in the form of flour or fine powder intimately combined with a bituminous or a resinous substance that will harden when cold, forms an excellent water-proof filling without materially adding to the weight of the tube, the handling of which is thus greatly facilitated. As a binder, tar, asphaltum, resin, or like substances are combined while in a fluid state with the cork; but whatever the substance or compound used I prefer to ram it solid into the chambers C, and this may be done by hand or by well-known mechanical devices, the rammers being constructed to fit the chambers C. When the chambers C are filled with the cork compound referred to, the tube retains a certain elasticity which enables it to better resist internal or external strain or pressure while expansion or contraction under varying temperatures will have no detrimental influence upon the filling, the tubes being consequently not liable to leak, as may be the case with a cement or concrete filling.

Instead of I-bars, T-bars $a'$ may be used in the construction of the tubular bodies. (See Figs. 3$^b$ and 5.) In this case I prefer, in lieu of the external hoops $c$, to form an armature around the bars $a'$ by closely winding wire or a wire cable, Fig. 3$^b$, around the same. If the tube is, however, to be subjected to great internal pressure, I employ in conjunction with the armature the outer hoops or rings $c$, as shown in said Fig. 3$^b$. In this construction the coupling-ring is secured to the end of the tube by means of angle-irons $m$, bolted thereto and to the web of the girders, as shown in said Fig. 5.

When tubes of very great strength are desired, I construct them of I-bars and provide them with an armature and hoop the same as described.

Instead of forming the tube around a form $b$ on a table revoluble about a vertical axis, as described in respect of Fig. 1, said tube may be formed on a frame or form revoluble about a horizontal axis, as shown in Fig. 2, in which a shaft $h$, revoluble in suitable bearings by hand or other power, carries a cylindrical form $h'$. The cylinder or form $h'$ is provided at one end with a head $b'$, of greater diameter than said cylinder $h'$, whose diameter is equal to that of the interior hoops or rings $c'$ of the tube to be formed. In the assembling of the tube the interior hoops $c'$ are first slipped onto the cylinder $h'$, one of said rings being pushed close up to the head $b'$. A bar $a$ is now placed in position on said hoops, and then the outer hoops $c$ are slipped over the bar, so as to lie above the inner hoops and the parts are bolted together. A second bar is now introduced between the hoops $c$ and $c'$, then a third, the cylinder $h'$ being revolved as the bars are inserted until the tube is completed. At suitable intervals the cylinder $h'$ is provided with circular rows of openings, of which one is shown at $h^2$, Fig. 2, on the left of said cylinder, near its head $b'$, said openings being of such size as to admit of the passage therethrough of the bolts $f$, and their heads used to bolt the hoops $c\ c'$ to the bars $a$, so that as the bars are placed on the cylinder, or after all of said bars have been placed thereon, the bolts $f$ may be inserted in their bolt-holes from the inside of cylinder $h'$, the positioning of the first bar $a$ between the hoops $c\ c'$ serving as a guide, as it is obvious that when said bar is once secured to the hoops, or, more properly, the latter to the bar, the other bolt-holes of said hoops will register with the opening in the cylinder $h'$, as well as with the bolt-holes in the bars afterward inserted between said rings. The tube so formed is then provided with a coupling-flange $l$ at the outer end, then taken from the cylinder $h'$, and if the chambers C thereof are to be filled with a water-proof material, this is done as described above, and the other coupling-flange is finally secured in place when the tube is ready for use.

Either of the revoluble devices shown in Figs. 1 and 2 may be employed in the construction of tubular bodies by means of T-bars, the winding of the wire or wire cable being effected by revolving the form. When this is done with the turn-table mechanism, the coupling-ring $l$ serves as a means for holding the bars in proper position.

When tubular bodies constructed as set forth are filled with a cork composition, such as described, and are used for subaqueous or submarine ways or conduits at a considerable depth, said tubes will be sufficiently light to float when their ends are closed, and it becomes necessary to ballast the same for the purpose of sinking them. This is done by partly filling the tube with a suitable ballast, or, preferably, by attaching thereto a sufficiently heavy body or bodies. This may be conveniently done by attaching to the bodies an anchor chain or chains from which a weight is suspended, which is afterward removed when the tubes are in their proper place, the chains $r$ being then attached to anchors A, permanently embedded in the bed of the water-course or sea. In the laying of these tubes under water the shore-end section is first laid in the usual manner, the end of the tube projecting into the water being closed by a sheet-lead disk $l'$. The next section of tube is then lowered, having both ends likewise closed with a sheet-lead disk, the two sections being then bolted together, the interposed lead sheets forming a water-tight packing. This operation is continued until the subway is completed to the opposite shore, the coupling being effected by divers, and the several pipe-sections properly anchored, as shown in Figs. 6, 7, and 8. When the subway or conduit is laid, as described, no water can enter the tube-sections, as they are hermetically closed at each end by the sheet-lead disks $l'$, so that after the subway or conduit is laid the sheet-lead partitions can be cut out from the inside, the workmen entering the conduit either from the shore end or through a suitable vertical tube connection T, Figs. 6 and 8. This mode of laying subways or conduits has also the advantage of excluding therefrom all dirt, gravel, or stones when laid underground, so that when the lead partitions are cut out the subway or conduit will need no cleaning out.

The described mode of laying the subways or conduits is, so far as I know, the best; but I desire it to be understood that I do not limit my invention exclusively to the said mode of laying such subways or conduits.

Having thus described my invention, what I claim as new therein, and desire to secure by Letters Patent, is—

1. A tubular body comprising I or T bars arranged parallel with one another with their flanges in contact and retaining devices for maintaining the bars in their relative positions, for the purpose set forth.

2. A tubular body comprising I or T bars arranged parallel with one another with their flanges in contact, whereby longitudinal chambers are formed between the webs of the bars, retaining devices for maintaining the bars in their relative positions, and a filling for the chambers, for the purpose set forth.

3. A tubular body comprising I or T bars arranged parallel with one another with their flanges in contact, whereby longitudinal chambers are formed between the webs of the bars, retaining devices for maintaining the bars in their relative positions, and a water or fire proof filling for the chambers, for the purpose set forth.

4. A tubular body comprising I or T bars arranged parallel with one another, whereby longitudinal chambers are formed between the webs of the bars, retaining devices for maintaining the bars in their relative positions, and a filling for said chambers composed of comminuted cork and a bituminous or resinous substance, for the purpose set forth.

5. A tubular body composed of I or T bars laid parallel to one another with their flanges in contact, in combination with interior and exterior hoops and a coupling-flange at each end, consisting of a ring arranged to project from the outer periphery of the tube and to close the end of the longitudinal chambers formed between the webs of the bars, for the purpose set forth.

6. A tubular body composed of I or T bars laid parallel to one another with their flanges in contact, and a water-proof substance or material filling the space between the webs of the bars, in combination with interior and exterior hoops secured together and to the bars and a coupling-flange at each end, consisting of a ring of such diameter as to project beyond the periphery of the tube and to close the end of said spaces, for the purpose set forth.

7. A tubular body composed of I or T bars laid parallel to one another with their flanges in contact, in combination with interior hoops, and an exterior armature composed of wire or wire rope or cable wound about the bars, and a coupling-flange at each end of the tube, for the purposes set forth.

8. A tubular body composed of I or T bars laid parallel to one another with their flanges in contact, in combination with an armature composed of wire or wire rope or cable wound about the bars, interior brace-hoops, a filling of water-proof material filling the space between the webs of the bars, and a coupling-flange at each end of the tube closing the end of said spaces, for the purpose set forth.

9. A tubular body composed of I or T bars laid parallel to one another with their flanges in contact, an armature composed of wire or wire rope or cable wound about the bars, a water-proof material filling the spaces between the webs of the bars, and a coupling-flange at each end of the tube, arranged to close the end of the said spaces, in combination with internal and external hoops bolted together and to the armature and bars, for the purpose set forth.

10. A tubular body having longitudinal chambers formed between its outer and inner periphery and a water-proof material composed of finely-divided cork and a bituminous or resinous substance filling said chambers, for the purpose set forth.

In testimony whereof I affix my signature in presence of two witnesses.

PETER KRAUS.

Witnesses:
  W. B. MURPHY,
  A. SCHLESSING.